(12) United States Patent
Britt et al.

(10) Patent No.: US 9,497,572 B2
(45) Date of Patent: Nov. 15, 2016

(54) INTERNET OF THINGS PLATFORMS, APPARATUSES, AND METHODS

(71) Applicant: AFERO, INC., Los Altos, CA (US)

(72) Inventors: Joe Britt, Los Altos, CA (US); Shin Matsumura, Los Altos, CA (US); Houman Forood, San Francisco, CA (US); Scott Zimmerman, Mountain View, CA (US); Phillip Myles, Los Gatos, CA (US); Sean Zawicki, Mountain View, CA (US); Daisuke Kutami, San Francisco, CA (US)

(73) Assignee: AFERO, INC., Los Altos, CA (US)

( * ) Notice: Subject to any disclaimer, the term of this patent is extended or adjusted under 35 U.S.C. 154(b) by 0 days.

(21) Appl. No.: 14/550,667

(22) Filed: Nov. 21, 2014

(65) Prior Publication Data

US 2016/0147506 A1    May 26, 2016

(51) Int. Cl.
*G06F 9/445* (2006.01)
*H04W 4/00* (2009.01)
*H04L 29/08* (2006.01)
*G06F 9/44* (2006.01)

(52) U.S. Cl.
CPC .............. *H04W 4/008* (2013.01); *G06F 8/36* (2013.01); *G06F 8/65* (2013.01); *H04L 67/10* (2013.01)

(58) Field of Classification Search
None
See application file for complete search history.

(56) References Cited

U.S. PATENT DOCUMENTS

| 7,146,613 | B2 * | 12/2006 | Chauvel ............. G06F 9/45504 711/6 |
| 2002/0013784 | A1 | 1/2002 | Swanson |
| 2008/0120701 | A1 | 5/2008 | Schiller et al. |
| 2009/0019423 | A1 * | 1/2009 | Halter ................... G06F 9/4411 717/114 |
| 2009/0327996 | A1 * | 12/2009 | Siegemund ............... G06F 8/20 717/107 |
| 2011/0191787 | A1 * | 8/2011 | Poleg ........................ G06F 9/44 719/328 |
| 2012/0036552 | A1 * | 2/2012 | Dare .................. H04L 41/0253 726/1 |
| 2013/0085614 | A1 | 4/2013 | Wenzel et al. |
| 2013/0246996 | A1 * | 9/2013 | Duggal ..................... G06F 8/35 717/104 |

(Continued)

FOREIGN PATENT DOCUMENTS

| IN | EP 2806356 A1 * | 11/2014 | ............... G06F 8/70 |
| WO | WO2014/131021 | 8/2014 | |

OTHER PUBLICATIONS

International Search Report and the Written Opinion of the International Searching Authority from counterpart PCT Application No. PCT/US2015/061308, mailed Mar. 16, 2016, 16 pages.

*Primary Examiner* — Isaac T Tecklu
(74) *Attorney, Agent, or Firm* — Nicholson De Vos Webster & Elliott LLP

(57) ABSTRACT

An Internet of Things system and method are described. For example, one embodiment of a system comprises: an IoT hub comprising a WAN interface to couple the IoT hub to an IoT service over the WAN, and a local communication interface to communicatively couple the IoT hub to a plurality of different types of IoT devices; and at least one IoT device having a memory for storing program code and a microcontroller for executing the program code, wherein the program code includes library program code comprising basic building blocks usable by a developer to implement any IoT device by creating application program code which utilizes the library program code, wherein at least one of the basic building blocks comprises a communication stack to enable communication with the IoT hub, the library program code provided to the developer in a software development kit (SDK) with the microcontroller.

14 Claims, 13 Drawing Sheets

(56) References Cited

U.S. PATENT DOCUMENTS

| | | |
|---|---|---|
| 2013/0307702 A1 | 11/2013 | Pal et al. |
| 2014/0047322 A1* | 2/2014 | Kim .................... G06F 17/2247 715/234 |
| 2014/0282357 A1 | 9/2014 | Padaliak et al. |
| 2014/0289366 A1* | 9/2014 | Choi ..................... G06F 9/4451 709/218 |
| 2014/0304381 A1 | 10/2014 | Savolainen et al. |
| 2014/0317293 A1* | 10/2014 | Shatzkamer ........ G06F 9/45558 709/226 |
| 2014/0351790 A1* | 11/2014 | Ghose ....................... G06F 8/70 717/120 |
| 2015/0006696 A1* | 1/2015 | Hershberg .............. H04L 67/12 709/223 |
| 2015/0019714 A1* | 1/2015 | Shaashua ................ H04L 67/24 709/224 |
| 2015/0201022 A1* | 7/2015 | Kim ...................... H04W 4/005 709/203 |
| 2015/0324181 A1* | 11/2015 | Segal ....................... G06F 8/61 717/178 |

\* cited by examiner

US 9,497,572 B2

INTERNET OF THINGS PLATFORMS, APPARATUSES, AND METHODS

BACKGROUND

1. Field of the Invention

This invention relates generally to the field of computer systems. More particularly, the invention relates to Internet of Things (IoT) platforms, apparatuses, and methods.

2. Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

IoT development and adoption has been slow due to issues related to connectivity, power, and a lack of standardization. For example, one obstacle to IoT development and adoption is that no standard platform exists to allow developers to design and offer new IoT devices and services. In order enter into the IoT market, a developer must design the entire IoT platform from the ground up, including the network protocols and infrastructure, hardware, software and services required to support the desired IoT implementation. As a result, each provider of IoT devices uses proprietary techniques for designing and connecting the IoT devices, making the adoption of multiple types of IoT devices burdensome for end users. Another obstacle to IoT adoption is the difficulty associated with connecting and powering IoT devices. Connecting appliances such as refrigerators, garage door openers, environmental sensors, home security sensors/controllers, etc, for example, requires an electrical source to power each connected IoT device, and such an electrical source is often not conveniently located.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
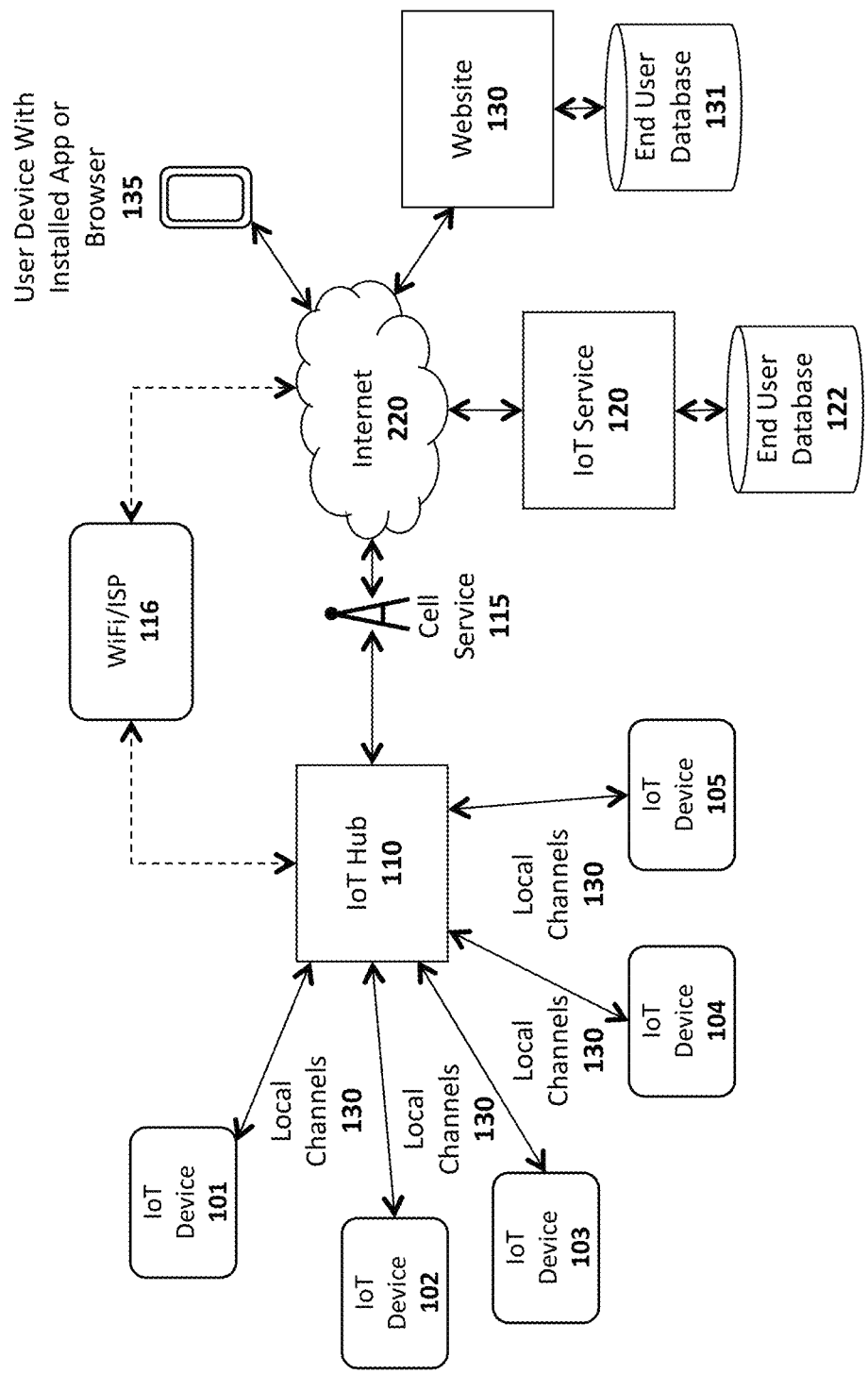
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130.

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
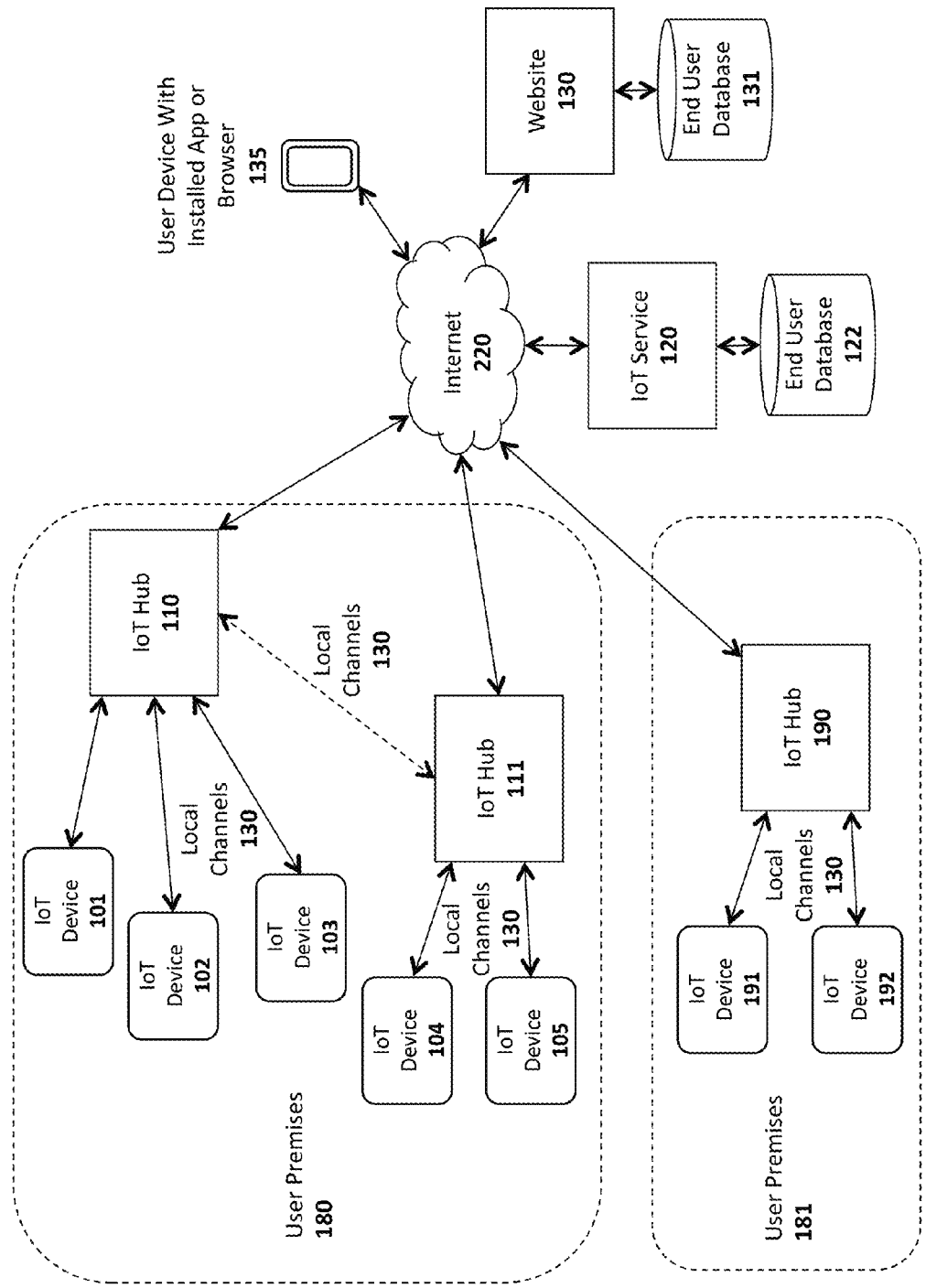

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
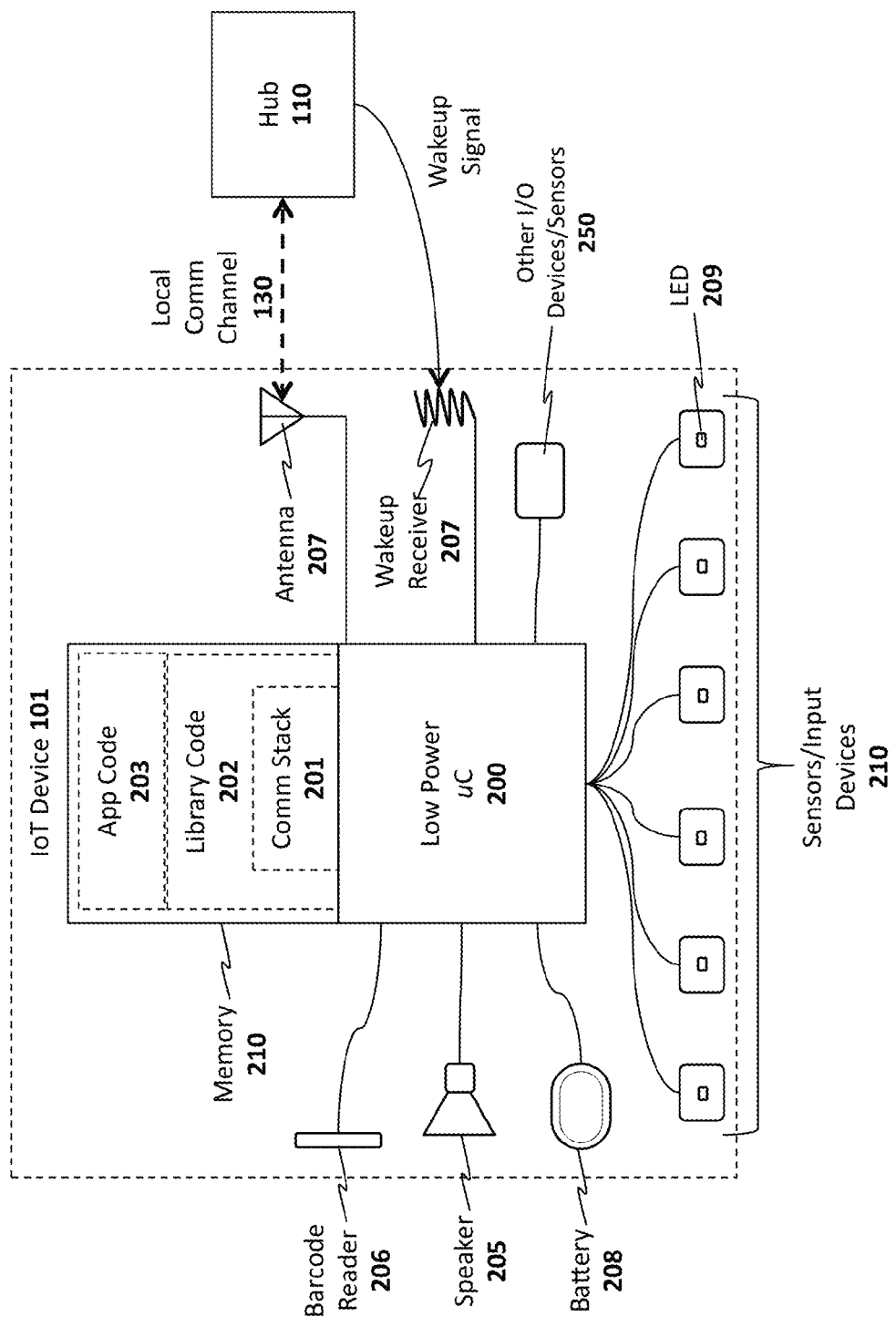
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys used by the embodiments described below (see, e.g., FIGS. 4-6 and associated text). Alternatively, the keys may be secured in a subscriber identify module (SIM) as discussed below.

Figure 3:
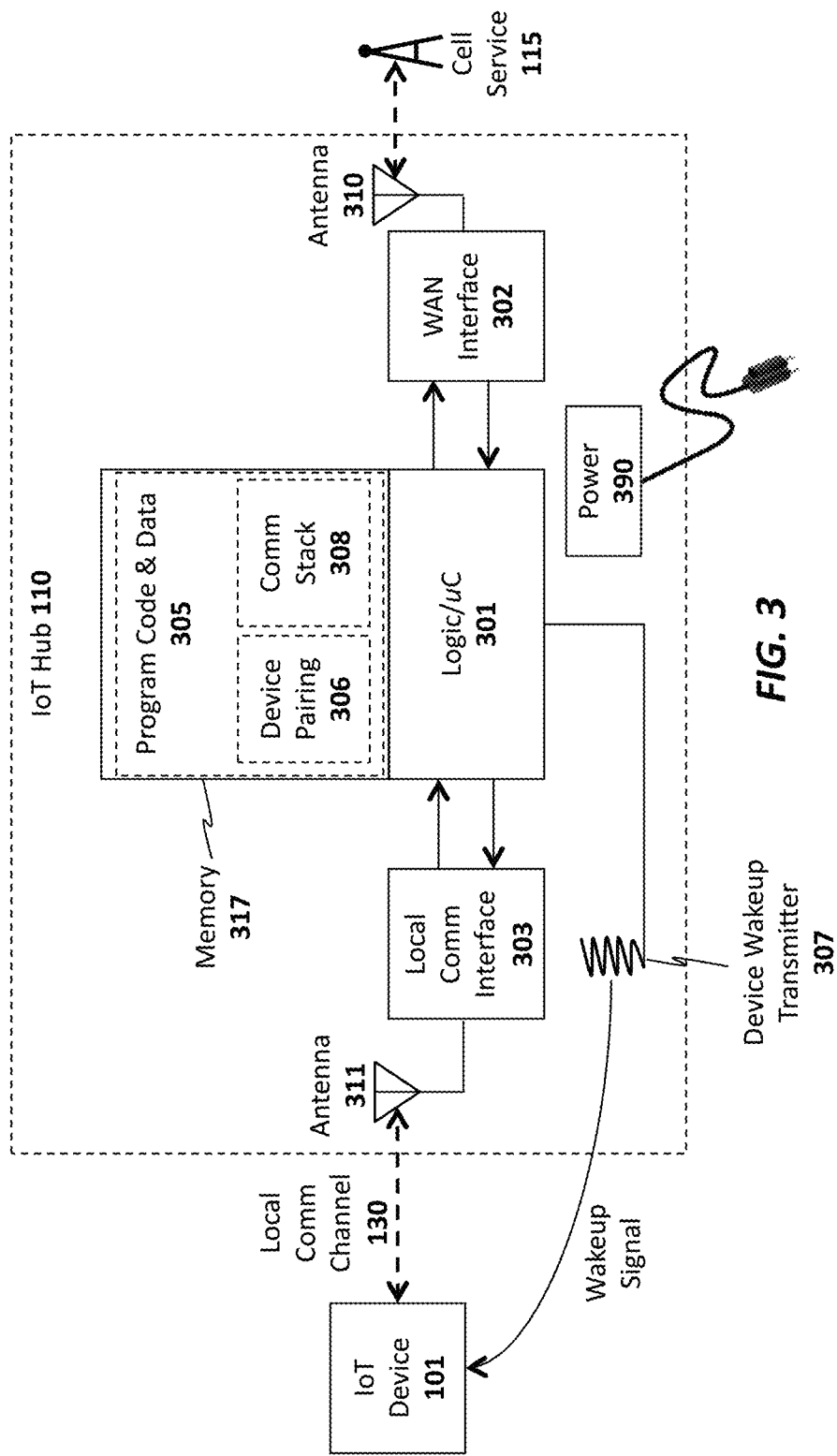
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys used by the embodiments described below (see, e.g., FIGS. 4-6 and associated text). Alternatively, the keys may be secured in a subscriber identify module (SIM) as discussed below.

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via NC power. In particular, the IoT hub 110 may include a power unit 390 with a transformer for transforming NC voltage supplied via an A/C power cord to a lower DC voltage.

Figure 4A:
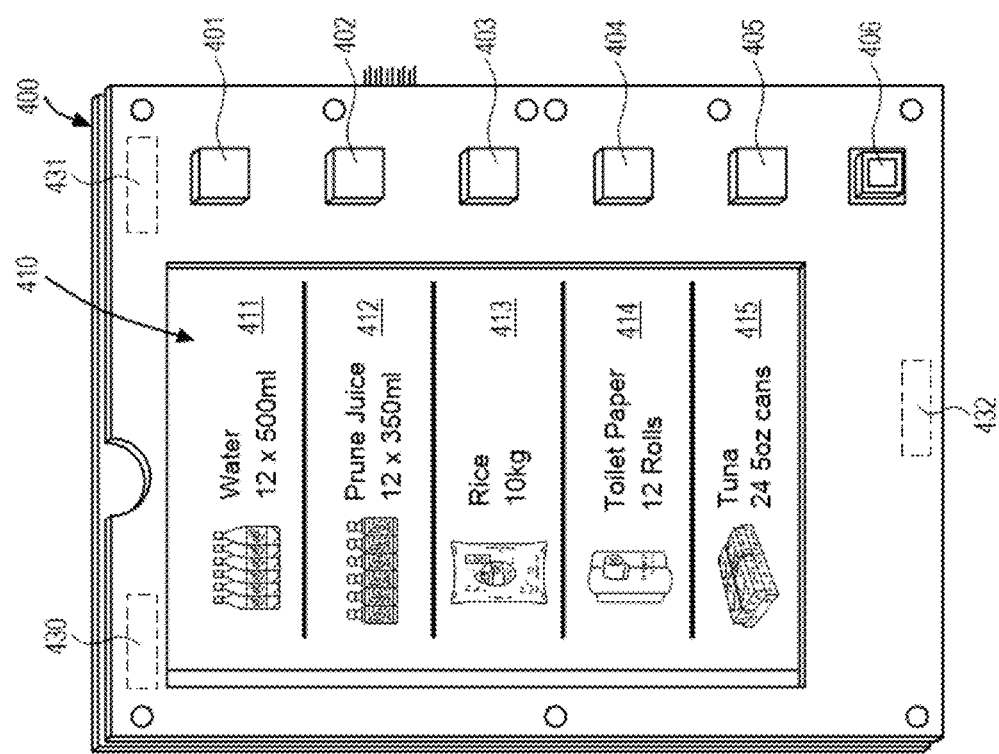
FIGS. 4A-B illustrate one embodiment of an IoT device for receiving and processing input from an end user.
Figure 4B:
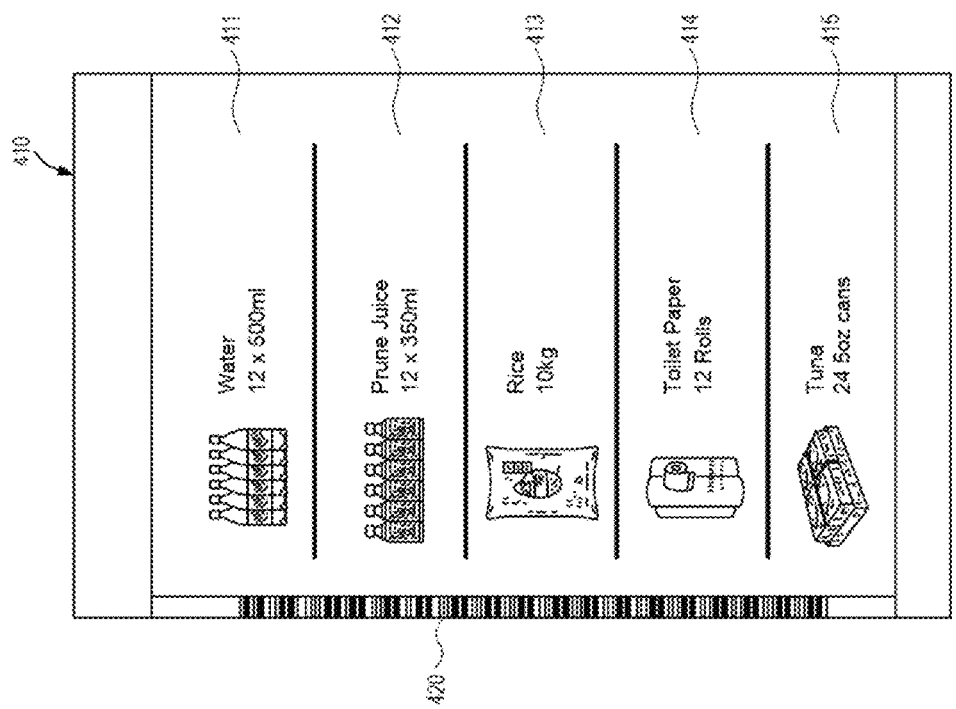

As mentioned, FIGS. 4A-B illustrate one particular embodiment of an IoT device 400 which is capable of receiving a card 410 containing a list of selectable items 411-415. As shown in FIG. 4B, the card may have a barcode 420 printed thereon which may be read by the barcode reader of the IoT device 400 to identify each of the printed items and associate the items with each of a corresponding plurality of user-selectable buttons 401. For example, in FIG. 4A, once the card 410 has been inserted into a slot on the device 400, button 401 is associated with item 411, button 402 is associated with item 412, button 403 is associated with item 413, button 404 is associated with item 414, and button 405 is associated with item 415. In this specific example, each of the items 411-415 comprise grocery items (e.g., water, prune juice, rice, toiler paper, and tuna). However, the underlying principles of the invention are not limited to any particular type of items. A set of magnets 430-432 may be coupled to the back of the IoT device 400 to allow the user to magnetically attach the IoT device 400 to the front of a refrigerator.

The illustrated IoT device 400 is particularly suitable for elderly users or other users who are not technically savvy (and/or do not have access to a full-featured client). In one embodiment, the son/daughter or other relative of the end user may establish an account on a grocery Website and uniquely design a set of cards 410 on behalf of the end user, based on the grocery items commonly ordered by the end user. The grocery Website 130 in this example may have an established business arrangement with the IoT service 120 such that the IoT service 120 manages the IoT devices 400 and cards 410 on behalf of the grocery Website 130. Thus, once items have been selected for each of the cards, the IoT service may send the end user (or the user's relatives) a new IoT device 400, an IoT hub 110 (if the end user does not already have one installed), and the set of cards 410.

In one embodiment, the IoT device 400 is pre-provisioned by the IoT service 120 with a unique ID embedded which is known by the IoT service. When the end user inserts a card 410 in the slot and selects one or more buttons 401-405 corresponding to items 411-415 displayed on the card, the unique ID associated with the device 400 and identification data identifying the items selected by the end user are transmitted over the cellular service 115 (or WiFi) to the IoT service and/or directly to the grocery Website 130. In one embodiment, the grocery Website maintains a mapping between the end user's account and the device ID which may be communicated to the grocery service by the IoT service 120 after provisioning the new device 400. Consequently, the grocery Website 130 identifies the end user with the device ID and fulfills the order for the items selected by the end user. For example, the grocery service may schedule delivery for the items to the end user's home address which may be stored in the end user database 121 along with the association of the user's device ID with the end user's account. Thus, in this embodiment, the IoT service 120 does not need to maintain a database containing any user account data (thereby protecting the end user's privacy and simplifying the implementation of the IoT service). Rather, the IoT service may only track the device ID for each of the IoT devices provisioned to end users.

In one embodiment, when a user has selected a particular item, the LED 209 in that button may be illuminated to reflect the selection. In one embodiment, to order multiple instances of an item, the user may select a particular button 401-405 multiple times. In this case, the LEDs may change colors to reflect the number of each item ordered. Alternatively, each button may have a small LCD (or other electronic visual display) configured to show the number of items selected by the end user. In one embodiment, the user may insert multiple cards 410 to select items in this manner and, when complete, select a completion button 406 which completes the transaction. In addition, the transaction may be completed automatically after a specified period of time has passed with no additional user input. Once the transaction is completed, in one embodiment, the LED within button 406 (or a separate "order on route" LED) may remain illuminated until a delivery is made to indicate that the ordered items are on the way.

In response, the low power microcontroller 200 transmits the device ID with identification data for each of the selected items (and the number selected) to the IoT hub 110 which forwards the user's selections to the IoT service 120 and/or directly to the grocery website 130. As mentioned, the address and other account information of the user may be associated with the device ID in an end user database 121. Accordingly, upon receipt of the transaction details, the user's account may be debited by an amount equal to the cost of the selected items, and delivery to the user's home may be scheduled. Upon delivery, the IoT device 400 may be reset to reflect that no new orders are currently pending.

In one embodiment, audio feedback is used to communicate the items ordered and the amounts for each item. For example, in one embodiment, digital audio samples for each item on each of the cards 410 may be transmitted to the device 400 via the IoT hub 410. The audio samples may then be played back using the audio decoder in the low power microcontroller 200 and the speaker 205. For example, when the user selects one package of water 411, the application program code 203 executed on the low power microcontroller 200 may identify the item (based on the barcode) and further identify a digital audio sample associated with the selected item. It may then cause the low power microcontroller 200 to render the digital audio sample on the speaker 205 along with a digital audio sample indicating the number ordered.

In an alternate embodiment, the application program code 203 executed on the low power microcontroller 200 may be capable of speech synthesis. In this case, a text description of each item may be provided to the IoT device 400, which will perform text-to-speech synthesis to verbally speak the text description upon selection of each item by the end user.

In one embodiment, once the user has finished selecting items and presses the completion button 406, details of the transaction may be audibly read back to the user through the speaker. This may include, for example, a description of the items ordered and/or an anticipated delivery date. In one embodiment, the delivery date information is transmitted to the IoT device 400 by the grocery Website 130 after the order details have been received and evaluated by the Website.

Although described above in the context of a grocery application, the IoT device 400 may be used for virtually any application which requires a user to select among a set of options. For example, a set of such devices may be placed outside of an apartment complex and cards may be inserted listing the names of the residences of each apartment. In response to a selection, the IoT device 400 may transmit a notification to the IoT service 120 (potentially with a picture of the user who made the selection if a network camera is available at the location). The IoT service 120 may then ring the doorbell of the appropriate residence and/or send a text or voice call to the user device 135 of the user in the residence. In one embodiment, the doorbell is implemented as another IoT device communicatively coupled to the IoT service via an IoT hub as described herein.

As another example, the IoT device 400 may be implemented as a toy or educational device. For example, a listing of different types of dinosaurs, animals, or other subjects may be printed on cards. In response to selection of a button, a description of the corresponding subject may be audibly generated for the end user. A virtually unlimited number of applications are possible in which a user is required to select from a set of displayed options.

Figure 5A:
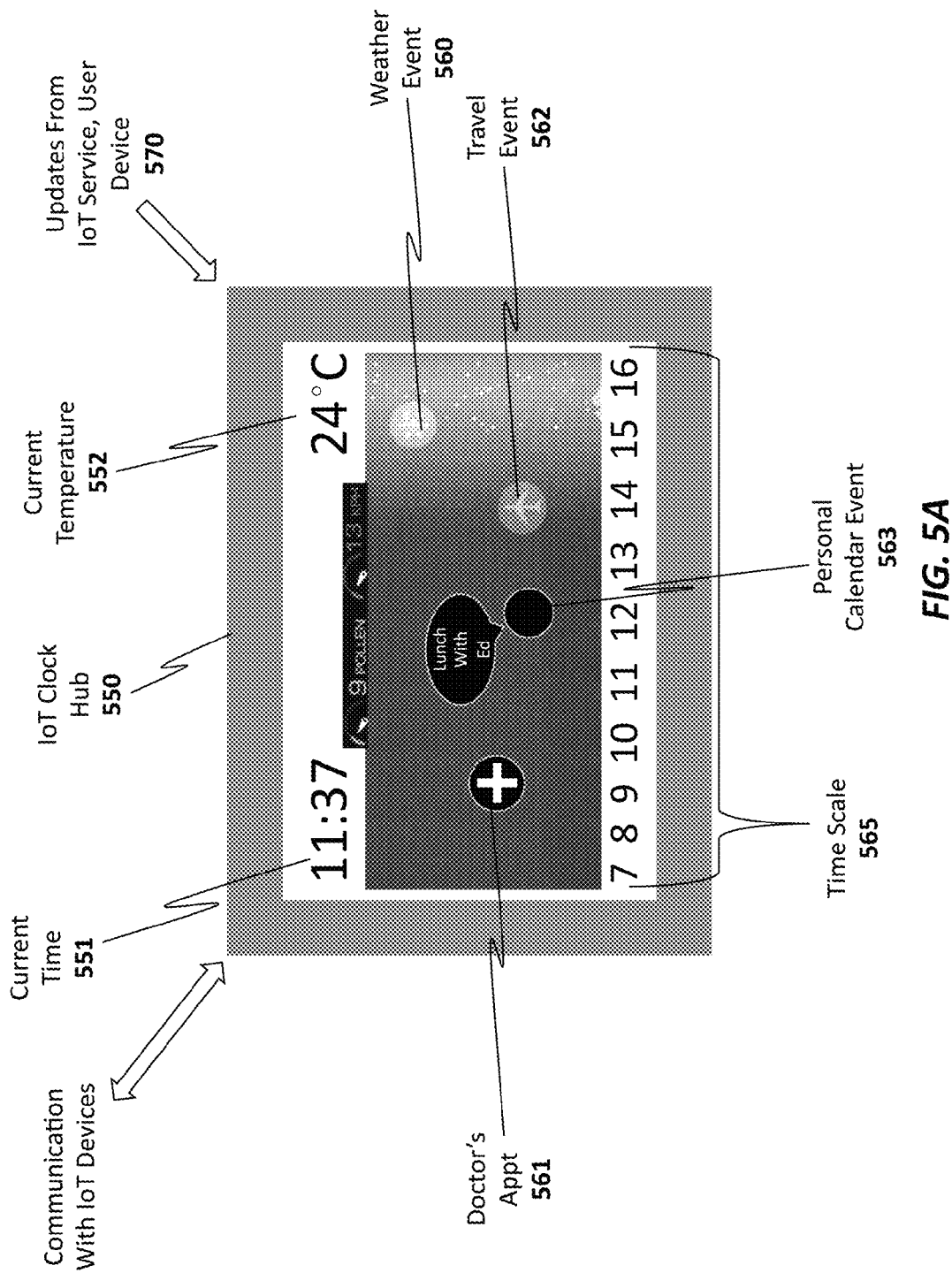
FIG. 5A illustrates one embodiment of an IoT hub implemented as a clock and information device.

In one embodiment, illustrated in FIG. 5A, the IoT hub 550 is implemented as a smart clock/calendar device capable of being mounted on a wall of the user's home or placed on an end table. In addition to the architectural components shown in FIG. 3, this embodiment includes a video display interface and screen for displaying various types of information including the current time 551 and temperature 552 and a set of calendar events 560-563 for the day. The video display interface may be integrated within the low power microcontroller 200 or may be implemented in a separate chip communicatively coupled to the microcontroller 200.

A time scale 565 is shown to provide a visual indication of the time at which each of the calendar events are scheduled to occur and, as illustrated, different graphics are used to connote different types of calendar events. In the specific example shown in FIG. 5A, the user has a doctor's appointment 561 at 9 am, a lunch appointment 563 at noon, and a travel event at approximately 2 pm. In addition, a weather event 560 is displayed to indicate that snow in the forecast starting at 3:30 pm. As indicated, transitional weather events such as snow or rain may be displayed in the background using graphics and/or animation (e.g., animation representing snow, rain, wind, etc). In one embodiment, when the user has an appointment, a small map may be displayed to indicate the location of the appointment and/or the address of the appointment may simply be displayed. The map/address display may also include an indication of the current amount of time required to travel to the appointment from the location of the IoT clock hub 550. All of the travel information may be extracted from an online mapping service such as Google Maps™ or Mapquest™. In one embodiment, indications of major events such as Earthquakes may also be displayed on the IoT clock hub 550 along with pertinent information (such as the location of the event). Of course, the above are merely illustrative examples. Various other types of information may be displayed on the IoT clock hub 550 within the context of the timeline 565.

In one embodiment, the IoT clock hub 550 will connect to the user's social networking service to download recently posted pictures and/or comments form the user's social networking account. These may include postings made by the user and/or made by friends and/or family members specified by the user. For example, the user may configured the IoT clock hub 550 to display new postings only made by certain specified "friends" of the user on the social networking site.

In one embodiment, updates to the data displayed on the clock is transmitted from the IoT service 120, one or more Websites 130 on which the user has accounts, and/or directly from an app on the user's device 135. For example, the calendar data may be provided by a calendar managed by the user via an app on the user device 135 and/or may be provided via a server-side calendar such as a Microsoft Exchange Server or a cloud-based server on which the user maintains a calendar (e.g., run on the IoT service 120 or Website 130). The current time and temperature may also be provided by network servers such as the IoT service 120 and/or may be read from one or more IoT devices 101-105 coupled to the IoT clock hub 550. For example, one of the IoT devices 101-105 may be an environmental sensor and may provide the IoT clock hub 550 with the current temperature, pressure, humidity, etc.

In one embodiment, the clock hub 550 is further configured to play back a user's audio playlist from an external server and/or the user's mobile device. For example, the IoT clock 550 may retrieve the playlist from the user's music library (e.g., using the protocols common to that library) and may then stream and play back the music in the playlist using the built in audio decoder and speaker 205. In one embodiment, the IoT clock hub 550 establishes a direct local connection with the user's mobile device 135 using the same network protocols that it uses to communicate with the IoT devices 101-105. For example, it may establish a Bluetooth LE audio connection with the user's mobile device 135 and then operate as a connected audio output for the mobile device.

In one embodiment, to keep the cost of the IoT clock hub 550 low, it does not include an input device to enter new entries directly on the clock. That is, the IoT clock hub 550 receives data from network sources but not directly from the user who updates entries via the app on the mobile device 135. Alternately, in one embodiment, the user may interact directly with the IoT clock hub 550 itself to enter new data (e.g., via a touchscreen built in to the IoT clock hub 550).

In addition to audio, one embodiment of the IoT clock hub 550 may download pictures to be displayed, either directly from the user's mobile device 135, from the IoT service 120, and/or from one or more other external servers (e.g., Website 130) on which the user stores pictures. The specific pictures, audio and other content to be displayed on the IoT clock hub 550 may be specified by the user interacting with and configuring the hub via the IoT service 120 (which, as mentioned, may be accessible via an app installed on the user's computing device 135).

In one embodiment, the IoT clock hub 550 may be configured to receive and display electronic messages sent by the end user. For example, it may be configured with an email message address or a text message address. For example, if the IoT clock hub 550 is in a highly visible location in the user's home, the user may send a message to the entire family by sending a text message or an email message to the IoT clock hub 550. In one embodiment, if the message contains a photo, then the IoT clock hub 550 may display the photo.

In one embodiment, the IoT service 120 acts as a translator for content to be displayed or played back on the IoT hub 110 and/or IoT devices 101-105. For example, in one embodiment, photos transmitted from the user's mobile device 135 are converted by the IoT service 120 into a format/resolution which the IoT hub 110 and/or IoT devices 101-105 are capable of rendering. Similarly, with respect to audio, the IoT service 120 may convert the audio into a format (potentially at a lower bitrate or different type of compression) that the IoT hub 110 and/or IoT devices 101-105 are configured to play back.

As mentioned above, the IoT clock hub 550 may be designed with mounting brackets or holes so that it may be mounted on a wall in a convenient location such as the user's kitchen. In addition, in one embodiment illustrated in FIG. 5B, the IoT clock hub 550 may be adapted to interface with different types/styles of artistic frames 501. In one embodiment, magnets 506 are attached or embedded within each frame 501 to magnetically attach the frame to the IoT hub clock 550 with may include corresponding magnets or metal around its periphery. Moreover, the IoT clock hub 550 may detect the model of frame which is attached based on the locations of the magnets 506 and/or based on an ID code encoded in the magnets. Thus, the position of the magnets or the encoding contained within the magnetic material may act as a fingerprint to uniquely identify different types of frames. Alternatively, or in addition to the use of magnets, the IoT clock hub 550 may include a physical interface to interface with the frame 501. In this embodiment, an ID code identifying the frame may be provided over the interface. In addition, the interface may include a physical audio connection for embodiments described below in which the frame includes speakers 505.

Figure 5B:
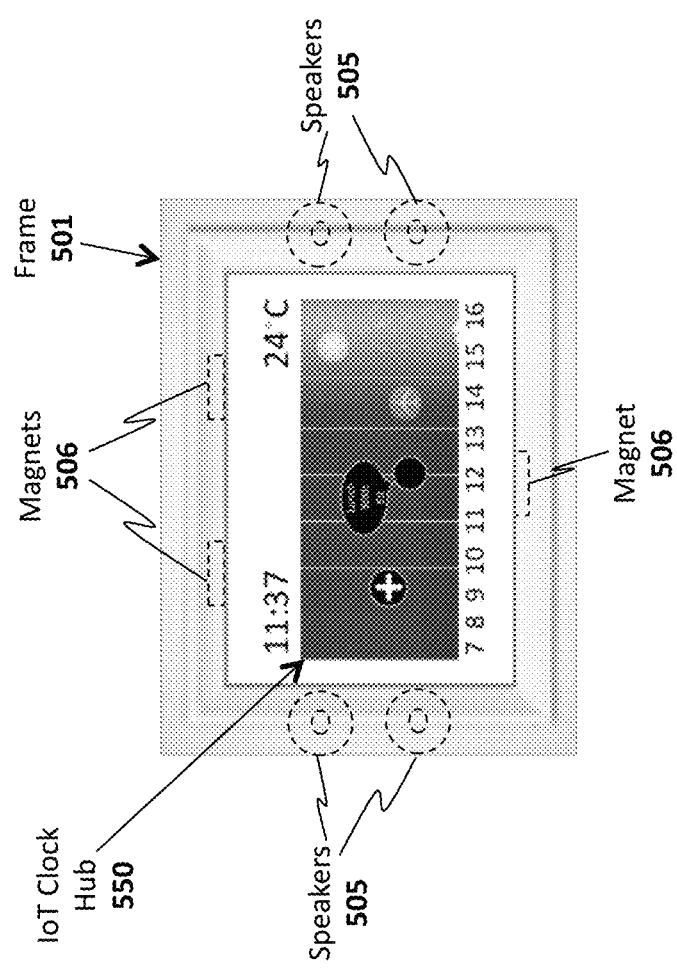
FIG. 5B illustrates one embodiment of the IoT hub clock/information device coupled to a frame with integrated speakers.

In one embodiment, the style of the information displayed within the IoT clock hub display may automatically be modified based on the type of frame being attached. For example, if a frame with a "modern" style is attached, then the colors/fonts/graphical styles used to display information on the IoT clock hub 550 may automatically switch to match the modern frame style. Similarly, if a frame with a "traditional" style is attached, then the colors/fonts/graphical styles used to display information on the IoT clock hub 550 may automatically switch to match the traditional frame style. One embodiment of the frame 501 may be designed for use in a child's room (e.g., a Hello Kitty™ frame or a Cuckoo clock may be designed). In response, the IoT clock hub 550 may be configured to display an appropriate background to match the frame type (e.g., displaying pictures of Hello Kitty or a Cuckoo on the hour). Moreover, while a rectangular frame is shown in FIG. 5B, other shapes such as circular or oval frames are also contemplated. In the case of a circular/oval frame, the display on the IoT clock hub 550 may be adjusted to accommodate the frame shape (e.g., not displaying content in regions of the screen obscured by the frame).

As mentioned, in one embodiment, the frame 501 is equipped with a set of high quality speakers 505 for generating audio provided over the audio interface from the IoT clock hub 550. For example, in an embodiment in which the IoT clock hub 550 downloads a user's audio playlist (as discussed above) and streams/decodes the audio identified in the playlist, the audio may be played through the high quality speakers 505 rather than the speaker 205 built in to the IoT clock hub 550.

A variety of different types of frames 501 may be coupled to the IoT hub 550 to provide various different I/O capabilities. For example, a frame with an embedded camera may be installed to take pictures or capture video in response to commands sent to the IoT hub 550 from the user's mobile device/app 135. Thus, the frame 501 may act as a local security camera in the user's home. In another embodiment, the frame may have an integrated IR blaster to act as a remote control device, controllable via the user device/app (e.g., to control local AN equipment such as the user's TV and receiver). In another embodiment, the frame 501 may be equipped with a heat sensor, smoke sensor, and/or carbon monoxide detector. In this embodiment, the IoT clock hub 550 may generate an alarm in response to any of the sensors indicating levels above acceptable thresholds. It may also be configured to transmit the alarm to a service such as a home monitoring service and/or the local fire department.

Figure 5C:
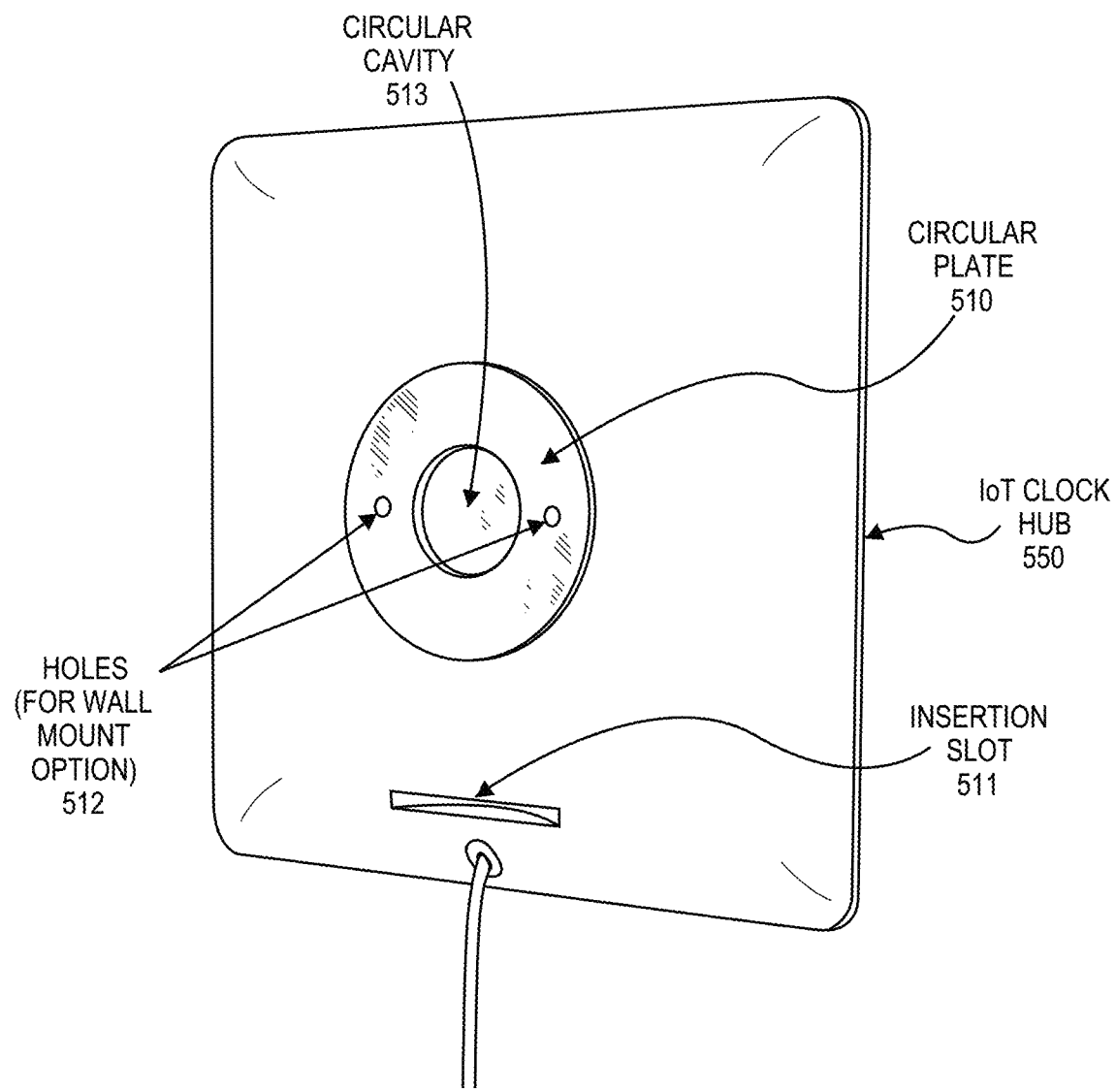
FIGS. 5C-F illustrate different embodiments of an IoT clock hub.
Figure 5D:
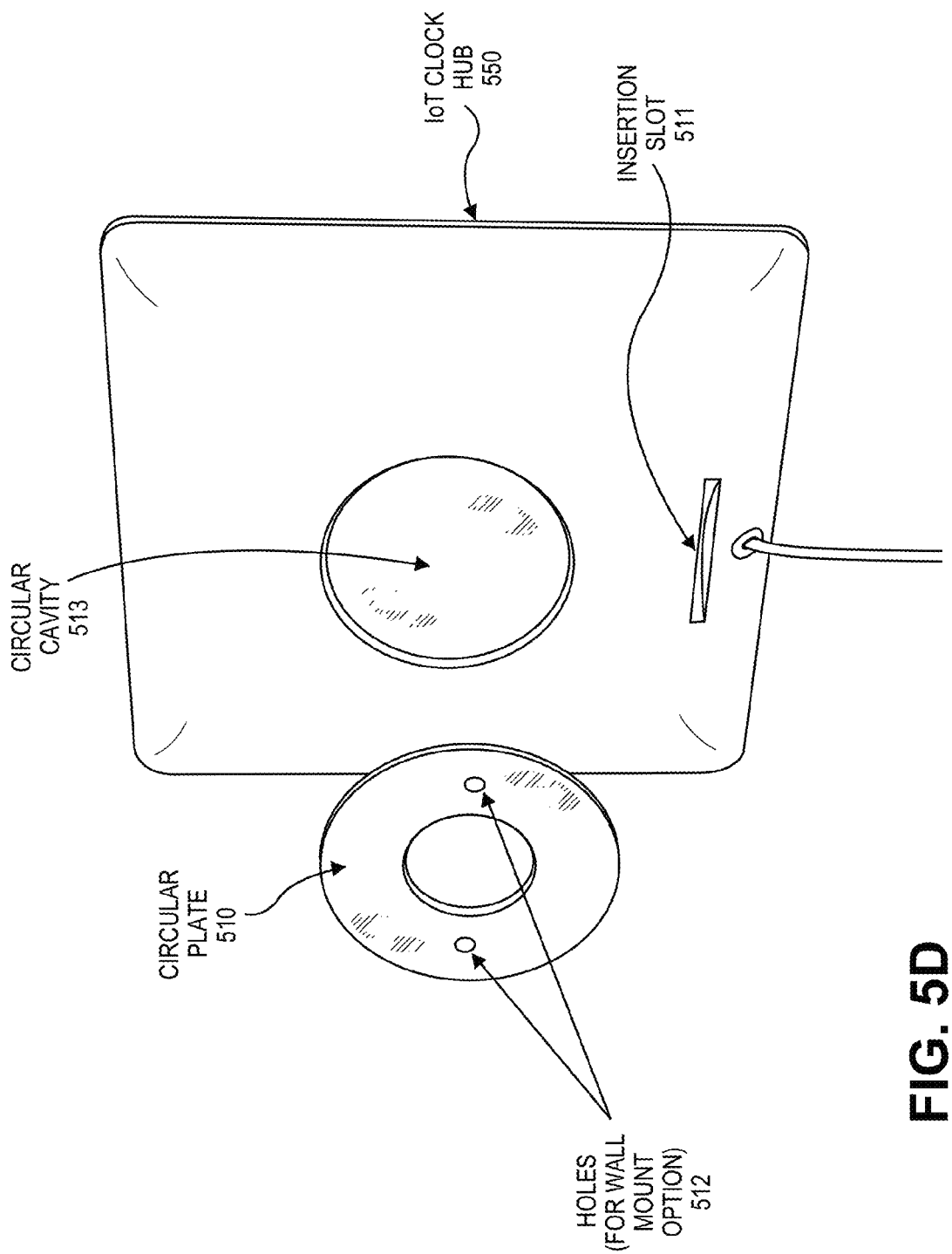
Figure 5E:
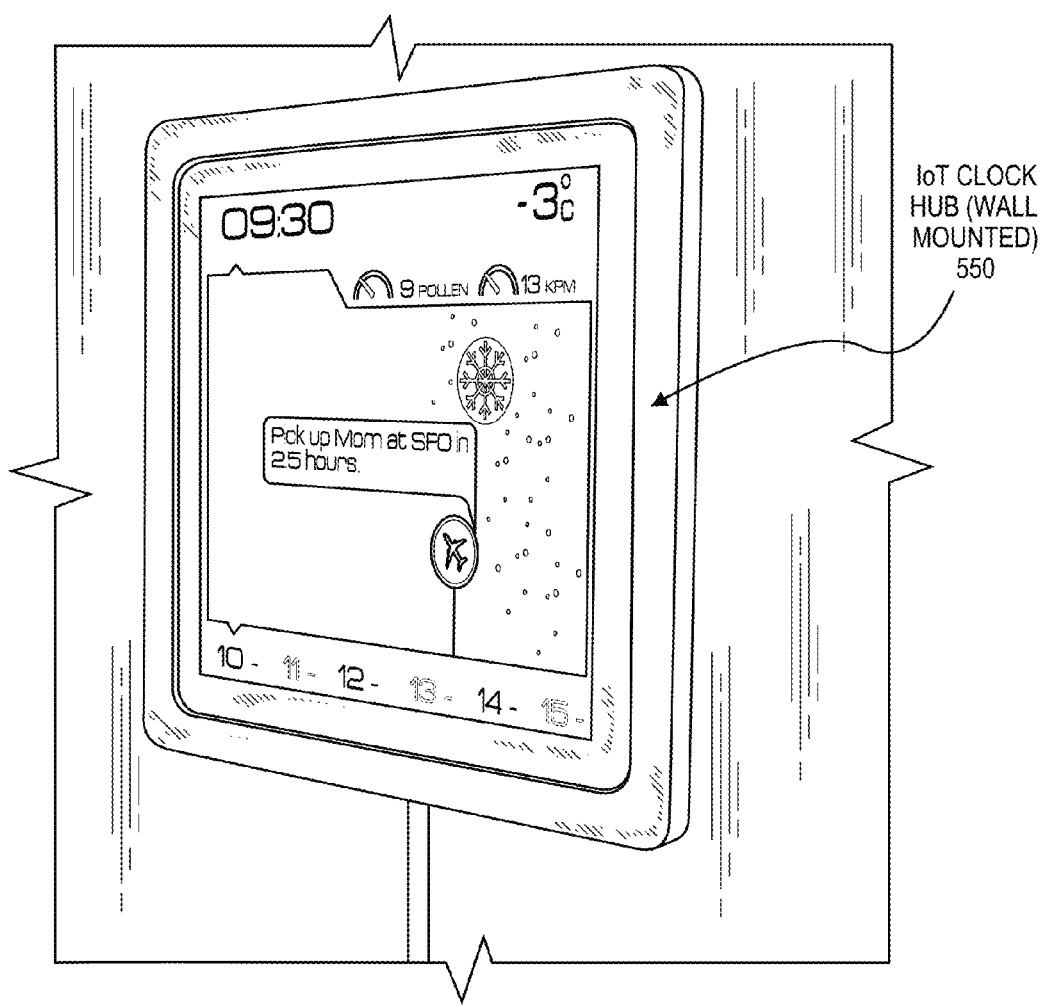

Another embodiment of the IoT clock hub 550 is illustrated in FIGS. 5C-F which includes options for mounting the IoT clock hub 550 on a wall or resting the IoT clock hub 550 on a desk (or other structure). Referring first to FIGS. 5C-D, the IoT clock hub 550 may be shipped to the end user with a circular plate 510 magnetically affixed within a circular cavity 513 formed on the back of the IoT clock hub 550. FIG. 5C shows the circular plate 510 magnetically attached within the cavity 513 and FIG. 5D shows the circular plate 510 removed from the cavity 513. The circular plate 510 may be formed from magnetic material and/or magnetic material may be included beneath the circular cavity 513 to allow the plate 510 to be fixedly attached when in contact with the circular cavity 513. In one embodiment, the circular plate 510 includes holes 512 through which screws may be drilled to affix the circular plate to a wall. The IoT clock hub 550 may then be attached to the circular plate 510 to affix the IoT clock hub 550 to a wall, as shown in FIG. 5E.

A circular plate 510 is particularly beneficial for wall mounting because a user may affix the circular plate 510 to the wall in any orientation (i.e., without using a level). The user may then magnetically affix and IoT clock hub 550 to the wall by magnetically engaging the circular plate 510 with the circular cavity 513 on the back of the IoT clock hub 550 and rotating the IoT clock hub 550 as needed to achieve the correct level.

Figure 5F:
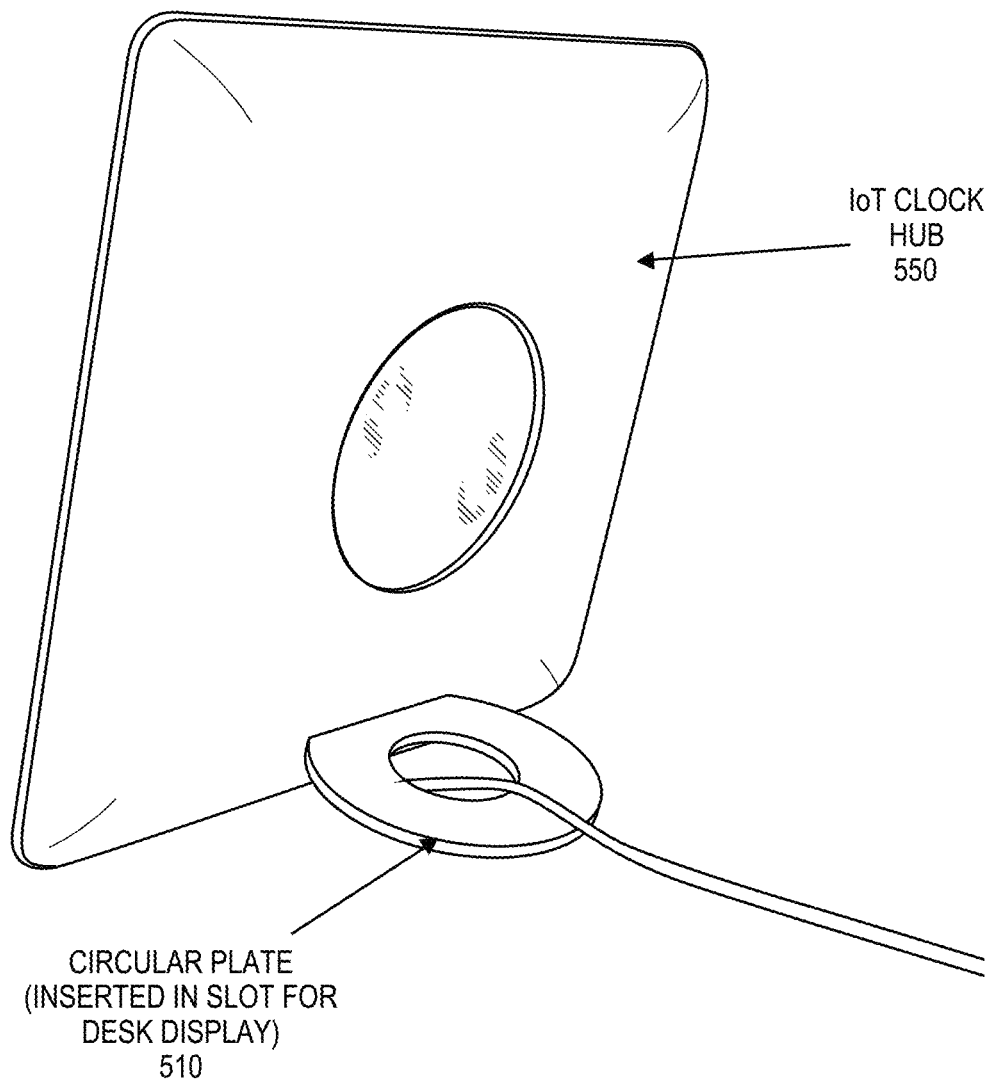

In addition, as shown in FIGS. 5C-D, the back of the IoT clock hub 550 may include an insertion slot 511 into which the circular plate 510 may be inserted to provide support if the user chooses to rest the IoT clock hub 550 on a table or desk (or other structure). FIG. 5F illustrates the circular plate 510 inserted in insertion slot 511 of one embodiment of the IoT clock hub 550. As illustrated, once inserted, the IoT clock hub 550 may be leaned backwards in a slightly angled orientation, relying on the balance provided by the circular plate 510.

Thus, a single support element—the circular plate 510—may be used for both wall mounting of the IoT clock hub 550 and for supporting the IoT clock hub 550 on a table or other surface.

Figure 6:
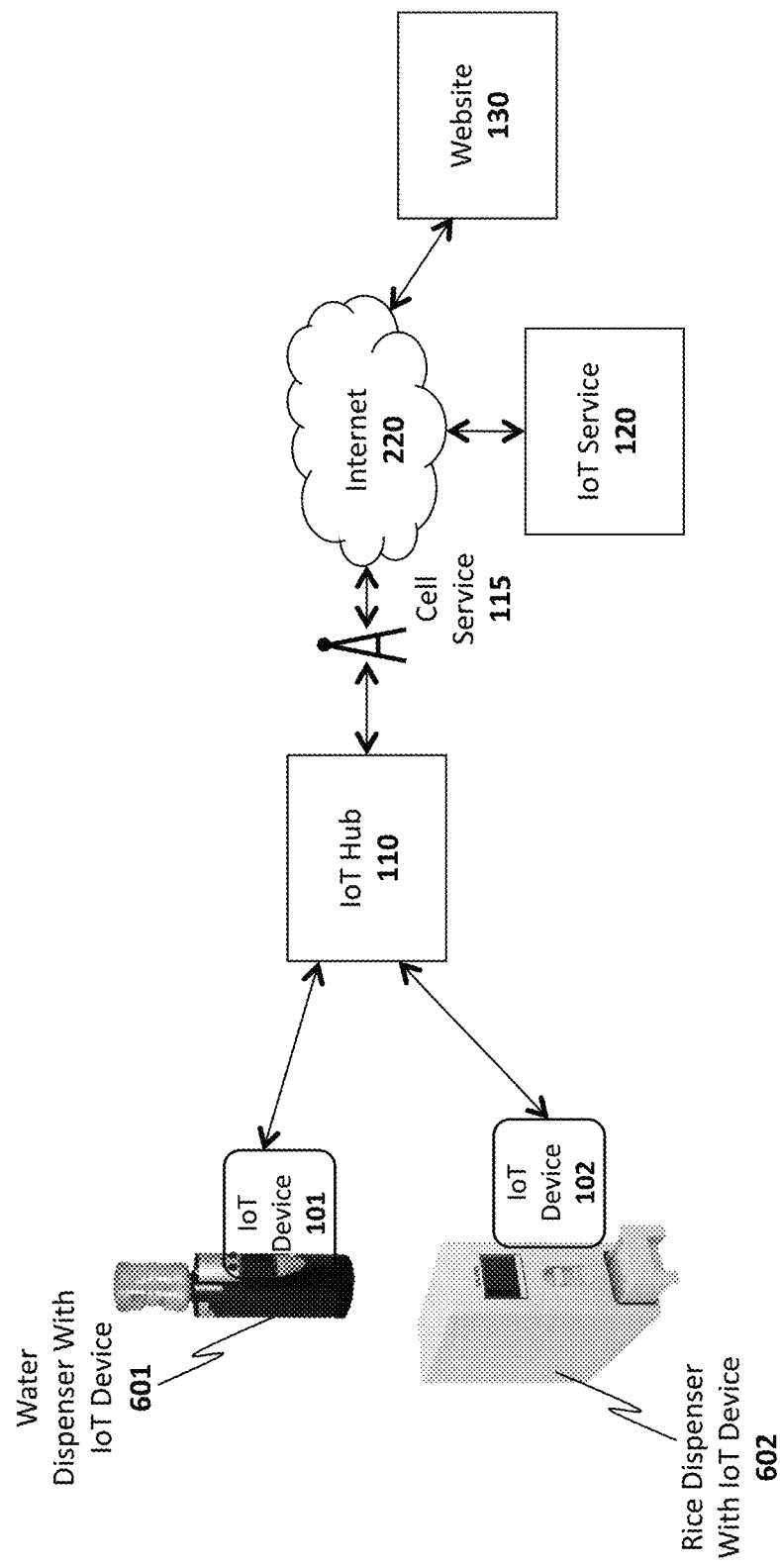
FIG. 6 illustrates a specific application of IoT devices for detecting when certain products in a user's home need to be replenished.

FIG. 6 illustrates a specific application in which one IoT device 101 is coupled to or embedded in a water dispenser 601 and another IoT device 102 is embedded in a rice dispenser 602. In one embodiment, the IoT device 101 includes a sensor (illustrated as 250 in FIG. 2) to detect whether the amount of water currently in the dispenser 601 is below a specified threshold amount. For example, the sensor 250 may measure the weight of the water in the dispenser and report the current weight to the low power microcontroller 200. Based on the application program code 203, when the weight reaches a specified threshold value, the IoT device 101 may transmit a message indicating that a new water container is needed. The message may be passed through the IoT hub 110 to the IoT service 120 and/or an external Website 130 to place an order for additional water. The order may include the identify of the IoT device 101 (using a unique ID code) which is associated with the user's account including the user's home address and billing data. The new water container may then be automatically shipped to the user's home. Similarly, the IoT device 102 within the rice dispenser 602 may detect when the weight of the rice contained therein reaches a specified threshold. The IoT device 102 may then automatically send a message (based on the application program code 203) when the weight reaches a specified threshold.

Various other sensors may be integrated within IoT devices 101-105 to collect various different types of information. For example, in one embodiment, IoT devices with heat sensors may be configured on or near a stove to detect when the stove's burners are on. In one embodiment, the IoT devices may also be configured to control the stove (e.g., turn it on/off) in response to signals transmitted from the app on the user's device 135. As another example, IoT devices may include accelerometers and be coupled to devices around the user's home and/or to the user himself to detect motion (to detect, for example, the number of steps taken by the user, or the frequency with which certain objects in the user's home are used, etc). The underlying principles of the invention may be implemented in a virtually unlimited number of applications and contexts.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An Internet of Things (IoT) system comprising:
   an IoT hub comprising a WAN interface to couple the IoT hub to an IoT service over the WAN, and a local communication interface to communicatively couple the IoT hub to a plurality of different types of IoT devices; and
   at least one IoT device having a memory for storing program code and a microcontroller for executing the program code, wherein the program code includes library program code comprising basic building blocks usable by a developer to implement any IoT device by creating application program code which utilizes the library program code, wherein at least one of the basic building blocks comprises a communication stack to enable communication with the IoT hub, the library program code provided to the developer in a software development kit (SDK) with the microcontroller.

2. The system as in claim 1 wherein the IoT device comprises a sensor to collect local data in accordance with the application program code and/or an output control device to perform an output control function in accordance with the application program code.

3. The system as in claim 1 wherein the application program code executable by the microcontroller to cause the IoT device to perform one or more application-specific functions, at least one of the functions including collecting local data or performing a local control function.

4. The system as in claim 1 wherein the IoT device further comprises a low power communication interface for establishing a local communication channel with the IoT hub in accordance with the library program code.

5. The system as in claim 3 wherein the local communication interface comprises a Bluetooth Low Energy (LE) radio for establishing a Bluetooth LE communication channel with the IoT hub.

6. The system as in claim 1 wherein the WAN comprises the Internet.

7. The system as in claim 1 wherein the SDK includes the IoT hub and provides the developer with access to the IoT service.

8. A method comprising:
   providing an IoT hub comprising a WAN interface to couple the IoT hub to an IoT service over the WAN, and a local communication interface to communicatively couple the IoT hub to a plurality of different types of IoT devices; and
   providing at least one IoT device having a memory for storing program code and a microcontroller for executing the program code;
   providing the program code including library program code comprising basic building blocks usable by a developer to implement any IoT device by creating application program code which utilizes the library program code, wherein at least one of the basic building blocks comprises a communication stack to enable communication with the IoT hub, the library program code provided to the developer in a software development kit (SDK) with the microcontroller.

9. The method as in claim 8 wherein the IoT device comprises a sensor to collect local data in accordance with the application program code and/or an output control device to perform an output control function in accordance with the application program code.

10. The method as in claim 8 wherein the application program code executable by the microcontroller to cause the IoT device to perform one or more application-specific functions, at least one of the functions including collecting local data or performing a local control function.

11. The method as in claim 8 wherein the IoT device further comprises a low power communication interface for establishing a local communication channel with the IoT hub in accordance with the library program code.

12. The method as in claim 10 wherein the local communication interface comprises a Bluetooth Low Energy (LE) radio for establishing a Bluetooth LE communication channel with the IoT hub.

13. The method as in claim 8 wherein the WAN comprises the Internet.

14. The method as in claim 8 wherein the SDK includes the IoT hub and provides the developer with access to the IoT service.

* * * * *